(12) United States Patent
Purpura

(10) Patent No.: US 6,826,029 B2
(45) Date of Patent: Nov. 30, 2004

(54) METHODS AND APPARATUS FOR DISTRIBUTING ELECTRICAL POWER

(75) Inventor: William J. Purpura, Anaheim, CA (US)

(73) Assignee: The Boeing Company, Chicago, IL (US)

(*) Notice: Subject to any disclaimer, the term of this patent is extended or adjusted under 35 U.S.C. 154(b) by 107 days.

(21) Appl. No.: 09/943,124

(22) Filed: Aug. 30, 2001

(65) Prior Publication Data

US 2003/0043518 A1 Mar. 6, 2003

(51) Int. Cl.[7] .............................................. H02H 5/04
(52) U.S. Cl. ...................................... 361/103; 361/104
(58) Field of Search ................................. 361/103, 104, 361/62, 93.9, 102; 307/11, 24, 29, 30, 31, 42, 149

(56) References Cited

U.S. PATENT DOCUMENTS

| | | | | |
|---|---|---|---|---|
| 4,104,581 A | * | 8/1978 | Arkosy | 324/523 |
| 5,357,142 A | * | 10/1994 | Kubota et al. | 307/10.1 |
| 5,510,691 A | * | 4/1996 | Palatov | 320/111 |
| 5,570,002 A | | 10/1996 | Castleman | |
| 6,011,398 A | * | 1/2000 | Bald et al. | 324/511 |
| 6,023,400 A | * | 2/2000 | Nevo | 361/42 |
| 6,054,846 A | * | 4/2000 | Castleman | 323/283 |
| 6,172,891 B1 | * | 1/2001 | O'Neal et al. | 363/146 |
| 6,232,675 B1 | * | 5/2001 | Small | 307/30 |
| 6,459,175 B1 | * | 10/2002 | Potega | 307/149 |

OTHER PUBLICATIONS

ARINC Series, ARINC 628 In–Seat Power Connectors, pages of a PDF file linked from page, Jul. 10, 2001.
"The SmartAdapter, FAQ's —Frequently Asked Questions,".
"The SmartAdapter, Operating & Setup Instructions,".
"One Power Adapter Does it All, The SmartAdapter,".
"The SmartAdapter+, Technical Specifications,".
"The SmartAdapter, Features & Benefits," 3 pages, Jun. 26, 2000.
Cigarette Lighter Power Splitter 3, Communications Electronics Inc.

* cited by examiner

Primary Examiner—Stephen W. Jackson
Assistant Examiner—Danny Nguyen
(74) Attorney, Agent, or Firm—Harness Dickey & Pierce P.L.C.

(57) ABSTRACT

A power splitter device includes a power input port, at least three power output ports that each have a separate, resettable overcurrent protection circuit with a maximum current rating; and a port switch configured to provide power from the input port to selectable combinations of one or more of the output ports. The combinations of one or more of the output ports include at least one combination of at least two of the output ports. In addition, the port switch is configured to prevent power from being applied to all of the output ports simultaneously.

19 Claims, 1 Drawing Sheet

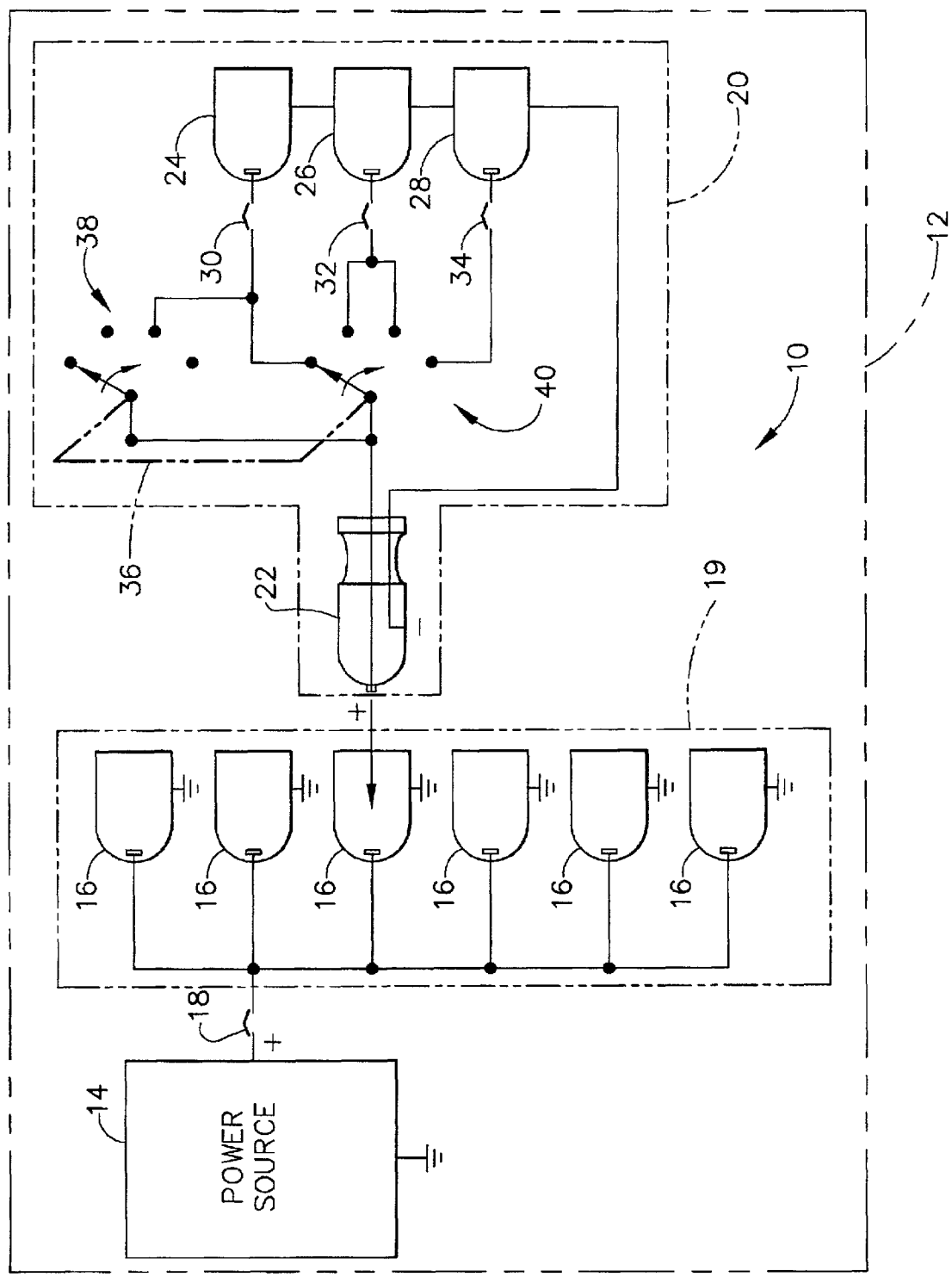

METHODS AND APPARATUS FOR DISTRIBUTING ELECTRICAL POWER

FIELD OF THE INVENTION

The present invention relates to methods and apparatus for distributing power to consumer devices, and more particularly to methods and apparatus for distributing power to consumer devices used by passengers on a mobile platform.

BACKGROUND OF THE INVENTION

An increasing number of travelers today are using portable computer devices and other electronic items. Thus, requests by travelers for power ports or sockets at airline seats are becoming more common. In response to these requests, many airlines have seat power ports that are equipped to power everything from laptop computers to handheld video and DVD players. Power at 15 VDC is provided at airline seat power ports by passenger amenity power distribution systems that are designed for an expected maximum power consumption of 50 to 100 watts per seat (as determined by the airline company), plus an extra margin of about 20%. Because of available margins, the nominal power consumption of most carry-on consumer electrical apparatus, and the incorporation of overcurrent protection circuits elsewhere in the distribution system, individual seat power ports have not been provided with individual overcurrent protection circuits.

As new electrical devices and passenger amenities are becoming available, some passengers now want to use more than one electrical device at the same time. Thus, some passengers are carrying and using power strips or adapters that allow connection of multiple electrical devices to a single seat power port. As a result, the expected maximum power consumption at that seat power port may be exceeded. Some excess consumption by one or a few passengers is not troublesome because the margins designed into the distribution system allows a few extra devices per plane to go unnoticed. However, if a sufficient number of passengers draw excess current from their seat power ports, a portion of the amenity power distribution system may be shut down even though a branch circuit breaker may not have tripped. Such a shutdown may inconvenience not only the passengers drawing excess current, but other passengers as well. In addition, certain revenue-generating passenger communication systems powered by amenity power distribution systems on some airlines (for example, mobile Internet access systems) may also be disrupted.

SUMMARY OF THE INVENTION

There is therefore provided, as one aspect of the present invention, a power splitter device having a power input port, at least three power output ports that each have a separate, resettable overcurrent protection circuit with a maximum current rating; and a port switch configured to provide power from the input port to selectable combinations of one or more of the output ports. The combinations of one or more of the output ports include at least one combination of at least two of the output ports. In addition, the port switch is configured to prevent power from being applied to all of the output ports simultaneously.

In another aspect of the present invention, a power distribution system is provided. The power distribution system has a power source configured to provide power to a plurality of seat connectors, a branch level overprotection circuit having a maximum current rating and providing overcurrent protection for current drawn in a branch of the system that has a plurality of seat connectors; and a power splitter device. The power splitter device has a power input port configured to receive power from one of the seat connectors, at least three power output ports and a port switch. The three power ports each have a separate, resettable port level overcurrent protection circuit having its own maximum current rating. The port switch is configured to provide power from the input port to selectable combinations of one or more of the output ports and is also configured to prevent power from being applied to all of the output ports simultaneously. The selectable combinations of one or more output ports that can be powered include at least one combination of two or more ports.

In yet another aspect of the present invention, a method for supplying power to a plurality of passenger devices at a passenger seat of a mobile platform is provided. The method includes selecting a combination of one or more output ports to be powered by the seat connector utilizing a port switch, wherein each output port has a separate overcurrent protection circuit having its own maximum current rating, and restricting the port switch from selecting combinations of output ports having overcurrent protection circuits with maximum ratings having a total greater than a preselected maximum current. Combinations selectable by the port switch include at least one combination of two or more output ports out of at least three output ports.

Configurations of the present invention advantageously allow power to be provided to more than one power output ports, thereby allowing more than one consumer electronic device to be utilized at the same time even though each electronic device requires a separate power output port. Some configurations of the present invention also limit a total amount of current that can be drawn by a passenger on a mobile platform and protect tripping of branches of power systems resulting from passenger overloads.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWING

The present invention will become more fully understood from the detailed description and the accompanying drawing, which is a schematic diagram of one configuration of the present invention in which a power splitter device is used to provide power to a selection of power output ports utilizing power provided from a seat connector of a power distribution system on a mobile platform.

DETAILED DESCRIPTION OF THE PREFERRED EMBODIMENT(S)

The following description of the preferred embodiment(s) is merely exemplary in nature and is in no way intended to limit the invention, its application, or uses.

In one configuration and referring to the FIGURE, a power distribution system 10 is provided that is suitable for use in a mobile platform 12, for example, an airplane. Power distribution system 10 comprises a power source 14 configured to provide power to a plurality of seat connectors or ports 16 that are provided by the mobile platform operator for the convenience of passengers. For example, seat connectors or ports 16 are 12 VDC sockets of a type similar to those found as lighter sockets in automobiles, or standard 15 VDC ARINC 628 connection points.

Although individual overcurrent protection circuits are not provided for each seat connector or port 16, protection is provided to groups of seat connectors 16 by a branch level overcurrent protection circuit 18, such as a fuse or resettable circuit breaker. A group of seat connectors 16 protected by a single branch level overprotection circuit 18 thus comprises a branch 19 of power distribution system 10.

In one configuration, at least one power splitter device 20 is provided to allow a corresponding number of passengers to draw power for more than one electrical device from a seat connector 16. A plug or other connector mating with seat connector 16 serves as a power input port 22 for power splitter 20. Power input port 22 receives power from a seat connector 16. In one configuration, power splitter device 20 is provided with at least three power output ports 24, 26 and 28. These ports are used to provide power to a passenger's electrical equipment (not shown) such as portable computers, CD players, and DVDs that the passenger may bring on board mobile platform 10.

Each output port 24, 26 and 28 is provided with a corresponding separate, port level overcurrent protection circuit 30, 32 and 34, respectively. In one configuration, overcurrent protection circuits 30, 32 and 34 are resettable circuit breakers. Each overcurrent protection circuit 30, 32 and 34 has its own maximum current rating not necessarily identical to the others. A port switch 36 is provided and configured to provide power from input port 22 to selectable combinations of one or more of output ports 24, 26 and 28. For example, in the configuration shown in the FIGURE, port switch 36 is a rotary switch having two ganged sections 38 and 40 that are configured to provide power in a first position to output port 24, in a second position to output port 26, in a third position to both output port 24 and output port 26, and in a fourth position to output port 28. No switch position is provided in which port switch 36 applies power to all output ports 24, 26 and 28 simultaneously. In this manner, port switch 36 is configured to prevent power from being applied to all output ports simultaneously, but can power at least one combination of two of the output ports. Also in this manner, port switch 36 is configured to prevent the combined current that can be drawn from output ports 24, 26, and 28 to exceed a predetermined amount. In other configurations, different selectable combinations of output ports and/or a different number of output ports are provided, and/or other types of switches, including electronic switches, are used for switching power to the output ports.

For example, a passenger with a laptop computer (not shown) connected to output port 24 and a CD player connected to output port 26 will be able to power both devices using one position of switch 36 or one or the other device (but not both) in two other positions of switch 36. The passenger could advantageously utilize this flexibility to listen to CDs while charging his or her laptop computer battery. However, the user would not be able to power a third device using output port 28 without turning off both devices connected to output ports 24 and 26. This limitation advantageously conserves power for other passenger amenities. Moreover, knowledge of the availability of power splitter devices 20 is expected to reduce the number of passengers that bring their own power strips or splitters.

In one configuration, port switch 36 is configured to prevent power from being applied to any combination of output ports 24, 26 and 28 having overcurrent protection circuits 30, 32 and 34 with maximum current ratings totaling more than a prorated seat connector share of the maximum current rating of the associated branch level overcurrent protection circuit 18, i.e., the branch level protection circuit defining the branch of the seat connector 16 from which device 20 draws current. For example, in one configuration, branch level overcurrent protection circuit protects six seat connectors 16 and has a maximum current rating of 36 amperes. A prorated share of the maximum current rating is defined in one configuration as the maximum current of branch level overcurrent protection circuit 18 rating divided by the number of seat connectors 16 in a branch. Thus, in the configuration shown in the FIGURE, the prorated share is 6 amperes. In another configuration, the prorated share includes an additional margin, and thus is less than the result of the division, for example, 5 amperes.

In yet another configuration, a preselected maximum current is specified, and switch 36 is configured to prevent power from being applied to any combination of output ports having overcurrent protection circuits with maximum current ratings totaling more than the preselected maximum current. (The preselected maximum current can be the same as a determined prorated share.)

In one configuration having a 5 ampere prorated share, port switch 36 is configured as shown in the FIGURE, and overcurrent protection circuits 30, 32, and 34 have maximum current ratings of 2, 3 and 5 amperes, respectively. Thus, port switch 36 cannot power any combination of output ports having port level overprotection circuits with maximum current ratings totaling more than the prorated share of 5 amperes. Also in this configuration, one port level overcurrent protection circuit 34 is a high current circuit having a highest maximum current rating. Output port 28 is thus a high current output port. In one configuration, port switch 36 is configured to provide power to output port 28 only in combination with no other output ports.

In some configuration, port level overcurrent protection circuits 30, 32 and 34 are not soldered or welded into power splitter device 20, but rather are configured to be replaceable by either a user and/or a mobile platform operator. These configurations allow reconfiguration of power splitter device 20 to better satisfy user preferences and/or allow mobile platform operators to increase or reduce the maximum possible total current that can be drawn when a power splitter device 20 is plugged into a seat connector 16. For example, a passenger may have two electrical devices, one requiring 0.7 amperes and the other requiring 3.5 amperes. The passenger might replace a 2 ampere overcurrent protection circuit 30 with one having a maximum rating of 1 ampere and a 3 ampere overcurrent protection device 32 with one having a maximum rating of 4 amperes.

Configurations of the present invention restrict the total amount of current that can be drawn from power splitter device 20 and thus reduce the chance that passenger electronic devices will overload a branch of power distribution 10. However, passengers are still provided with the ability to use more than one power output port for electronic devices. Moreover, because each power output port of power splitter device 20 has a separate overcurrent protection circuit, current to a device already receiving power will not be interrupted even if a circuit overcurrent protection device trips when a second device is plugged into another powered output port.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

What is claimed is:

1. A power splitter device comprising:
   a power input port;
   at least three power output ports each having a separate, resettable overcurrent protection circuit, each of said overcurrent protection circuits having its own maximum current rating; and
   a port switch configured to provide power from said input port to selectable combinations of one or more said output ports, including at least one combination of two or more said output ports, said port switch restricted from selecting all said output ports simultaneously.

2. A device in accordance with claim 1 wherein said port switch is further configured to restrict selection of any combination of said output ports having overcurrent protection circuits with maximum current ratings totaling more than a preselected maximum current.

3. A device in accordance with claim 2, wherein a highest of said maximum current ratings of said overcurrent protection circuits is equal to said preselected maximum current.

4. A device in accordance with claim 2, wherein:
   one of said overcurrent protection circuits is a high current circuit having a highest maximum current rating; and
   said port switch is configured to provide current to said output port having the high current circuit only in combination with no other said output port.

5. A device in accordance with claim 1 wherein said ports are selected from the group consisting of 12 VDC power connectors and ARINC 628 connection points.

6. A device in accordance with claim 1 wherein said resettable overcurrent protection circuits are user-replaceable.

7. A power distribution system comprising:
   a power source configured to provide power to a plurality of seat connectors;
   a branch level overprotection circuit having a maximum current rating and providing overcurrent protection for current drawn in a branch of said system comprising a plurality of seat connectors; and
   a power splitter device having a power input port configured to receive power from one of said seat connectors, at least three power output ports each having a separate, resettable port level overcurrent protection circuit, each of said overcurrent protection circuits having its own maximum current rating; and a port switch configured to provide power from said input port to selectable combinations of one or more said output ports, including at least one combination of at least two said output ports, said port switch further configured to restrict selection of all said output ports simultaneously.

8. A system in accordance with claim 7 wherein said port switch is further configured to restrict selection of any combination of said output ports having port level overcurrent protection circuit with maximum current ratings totaling more than a prorated seat connector share of said maximum current rating of one of said branch level overcurrent protection circuits.

9. A system in accordance with claim 8, wherein a highest of said maximum current ratings of said overcurrent protection circuits is equal to said prorated seat connector share.

10. A system in accordance with claim 9, wherein:
    one of said port level overcurrent protection circuits is a high current circuit having a highest maximum current rating; and
    said port switch is configured to provide current to said output port having the high current circuit only in combination with no other said output port.

11. A system in accordance with claim 7 wherein said input port and said output ports are selected from the group consisting of 12 VDC power connectors and ARINC 628 connection points.

12. A system in accordance with claim 7 installed on a mobile platform.

13. A system in accordance with claim 12 wherein the mobile platform comprises an aircraft.

14. A method for supplying power to a plurality of passenger devices at a passenger seat of a mobile platform, said method comprising:
    providing at least three output ports coupled a port switch configured to selectively power said output ports including at least one combination of two or more output ports from a seat connector, wherein each output port has a separate overcurrent protection circuit having a maximum current rating; and
    restricting the port switch from selecting combinations of output ports having overcurrent protection circuits with maximum ratings having a total greater than a preselected maximum current.

15. A method in accordance with claim 14 wherein the preselected maximum current is a prorated seat connector share, and further comprising the step of determining a prorated seat connector share.

16. A method in accordance with claim 14 wherein the mobile platform comprises an aircraft.

17. A method in accordance with claim 14 further comprises replacing at least one of the overcurrent protection circuits with another having a different maximum current rating.

18. A power splitter device comprising:
    a power input port;
    at least three power output ports each having a separate, resettable overcurrent protection circuit, each of said overcurrent protection circuits having its own maximum current rating and wherein one of said overcurrent protection circuit is a high current circuit having a highest maximum current rating; and
    a port switch configured to provide power from said input port to selectable combinations of one or more said output ports, including at least one combination of two or more said output ports, and further configured to prevent power from being applied to all said output ports simultaneously, to prevent power from being applied to any combination of said output ports having overcurrent protection circuits with maximum current ratings totaling more than a preselected maximum current, and to provide current to said output port having the high current circuit only in combination with no other output port.

19. A power distribution system comprising:
    a power source configured to provide power to a plurality of seat connectors;
    a branch level overprotection circuit having a maximum current rating and providing overcurrent protection for current drawn in a branch of said system comprising a plurality of seat connectors; and
    a power splitter device having a power input port configured to receive power from one of said seat connectors, at least three power output ports each having a separate, resettable port level overcurrent protection circuit, each of said port level overcurrent protection circuits having its own maximum current rating, wherein a highest of said maximum current ratings of said port level overcurrent protection circuits is equal to said a prorated seat connector share and is a high current circuit having a highest maximum current rating;

and a port switch configured to provide power from said input port to selectable combinations of one or more said output ports, including at least one combination of at least two said output ports, said port switch further configured to prevent power from being applied to all said output ports simultaneously, to prevent power from being applied to any combination of said output ports having port level overcurrent protection circuit with maximum current ratings totaling more than said prorated seat connector share of said maximum current rating of one of said branch level overcurrent protection circuits, and wherein said port switch is configured to provide current to said output port having the high current circuit only in combination with no other said output port.

* * * * *